United States Patent [19]

Walters

[11] 4,367,987
[45] Jan. 11, 1983

[54] DISPENSING SYSTEM FOR POROUS FLOOR CONTAINERS

[76] Inventor: Armon J. Walters, 39 Haverhill Rd., Trumbull, Conn. 06611

[21] Appl. No.: 203,015

[22] Filed: Nov. 3, 1980

[51] Int. Cl.³ .................... B65G 53/66; B65G 53/40
[52] U.S. Cl. ................................. 406/15; 406/24; 406/93; 406/138; 406/146
[58] Field of Search ............. 406/15, 23, 24, 25, 406/32, 33, 90, 91, 93, 106, 138, 146

[56] References Cited

U.S. PATENT DOCUMENTS

| | | | |
|---|---|---|---|
| 2,924,489 | 2/1960 | Beckmann | 406/90 |
| 3,208,799 | 9/1965 | Rivers | 406/138 X |
| 3,994,824 | 11/1976 | White et al. | 406/138 X |
| 4,149,755 | 4/1979 | Handleman et al. | 406/90 |

FOREIGN PATENT DOCUMENTS 1315386  5/1973  United Kingdom .................. 406/25

*Primary Examiner*—Jeffrey V. Nase
*Attorney, Agent, or Firm*—Thomas L. Tully

[57] ABSTRACT

A closed system for fluidizing and conveying solid particulate material from one or more porous floor supply containers to one or more receptor containers by means of aeration while preventing the release of aerated particulate material into the atmosphere. The system comprises at least one porous floor supply container which receives pressurized air to fluidize the particulate material and which feeds the fluidized mixture to a delivery conduit which communicates with the receptor container(s). The invention comprises venting the supply container to a material recovery unit to isolate the vented aeration air and all of the particulate material carried thereby and then readmitting at least said vented particulate material to the system, the vent air being passed through a filter before release to the atmosphere.

24 Claims, 3 Drawing Figures

DISPENSING SYSTEM FOR POROUS FLOOR CONTAINERS

BACKGROUND OF THE INVENTION

The handling of carcinogenic powders and toxic chemicals in paper bags has proven to be a hazardous and dangerous operation. Therefore, the Federal Government has regulated that such materials be used in a manner which precludes any operator being exposed to breathing or directly contacting such materials. Also, since many of these materials are very dense and of a nature that readily compacts during shipment, the use of rigid containers with conventional side door discharge or bottom cone discharge has not proven practical.

These discharge problems have resulted in the development and use of self-contained portable containers which have a fluid bed or porous floor which permits introducing air to fluidize the material within the container so that it will flow therefrom either by gravity or by means of a screw conveyor, a porous-floor conveyor, or a vacuum system. Such containers may be round, square, or rectangular and may have rigid sides or flexible sides which permit meeting of the containers when they are empty, but all have the porous floor or fluid bed concept as a common feature.

The fluid bed or porous floor concept requires that air be induced under the porous floor so that it will permeate through the porous floor and aerate the material and cause it to be fluidized. This requires that a vent system be applied to the porous floor container, no matter whether the container is being gravity discharged, discharged through a vacuum conveying system, a porous-floor conveyor, or by a screw conveyor, since the volume of fluidizing air introduced to the container must be released from the container. Such air passes through the material during aeration and consequently picks up fine particles of the material so that the air which must be released from the container includes large amounts of the solid particulate material, which may be carcinogenic or toxic, in the form of air-borne dust or powder. It is imperative that this contaminated air be contained so that is is not permitted to pollute the air in the work space around the container or the atmosphere if it is discharged outside the building.

THE INVENTION

The present invention involves systems and apparatus for containing the contaminated air that is vented from porous floor or fluid bed containers in a vacuum conveyor system. One method is to provide an adjacent pulse jet filter so that all vented air from the container is taken through the filter and all dispersed solid particles are removed from the air stream and returned directly to the system. The air, after leaving the pulse jet filter, may then be discharged to the work area or the atmosphere without danger of pollution, since it is free of contaminating particles. This system applies regardless of whether the fluid bed container is being discharged by gravity, or by means of an educator/ejector system such as disclosed by U.S. Pat. No. 3,777,775, or by means of a screw conveyor or a porous-floor conveyor. This system works extremely well where the vacuum conveying system is operating at a very low rate of discharge and is using a small volume of air, thereby requiring that the filtered fluidizing air be vented since it cannot be accommodated by the vacuum conveyor conduit.

The present system is suitable for use with rigid fluid bed containers, porous floor containers or flexible wall porous floor or fluid bed containers. However, when a porous floor fluid bed container with flexible sides or walls is used, such as in U.S. Pat. No. 3,777,775, it is imperative that provisions be made so that the container is not overpressurized, thereby causing it to either explode or force the porous wall out of the clamps which clamp the porous wall to the rigid floor of the container. This requires that a constant pressure be maintained within the flexible wall bag in order to keep it extended but without restricting the flow of air. It also requires controls so that in the event a stoppage occurs, the source of aeration air will be cut off so that a hazardous situation does not occur.

The present invention also provides a modified system for vacuum conveying operations in which the amount of vacuum-conveying air equals or exceeds the volume of fluidizing air that is being injected into the fluid bed or porous floor container. This system also applies to the use of both rigid and flexible containers and includes a system of connections and controls which direct the vented contaminated air directly into the vacuum-conveying air stream and which control the fluidizing air flow to maintain the necessary vacuum to unload the product from the container and further control the mixing of the contaminated vent air with additional clean make-up air to provide the full complement of conveying air and produce the necessary solids to air ratio in the vacuum conveyor conduit. This system also includes a series of controls to prevent either excessive or insufficient air pressure in the flexible bag container and provides the necessary controls and safeguards so that, in the event of a blockage of the conveying line, the vent air and hazardous dust particles will not be released to the work area or the atmosphere. The vacuum-conveying air mixture is conveyed from the vacuum conduit to a vacuum filter receiver where the solid product is separated from the conveying air and the air is then filtered through a filter media and ultimately discharged either to the work area or the atmosphere in the form of filtered, purified air.

The present invention permits the location or placing of the present fluid bed or porous floor containers on a scaling system to permit scaling precise quantities of the particulate material by means of the loss-in-weight or subtract-weight scaling principle. The system has been designed to provide delivery of the conveyed particulate product from the vacuum conduit to either a portable vacuum filter receiver, which may be located over a receiver hopper or mixer, or to a multitude of vacuum filter receivers that are located over a multitude of receiver hoppers or mixers. Each of the present systems is designed to provide complete control of all of the conveying air and the vent air within a closed system so that no toxic or hazardous dust is discharged into the air.

According to another embodiment of the present invention, a portable scaling system is provided in which either the rigid or flexible porous floor or fluid bed container is portable, i.e., mounted on wheels, so that it is movable to any particular supply station for discharge by either screw conveyor, gravity or porous-floor discharge unit.

Still another embodiment of the present invention provides a sharp cut-off in the introduction of particulate material to the conveying line and purging of the vacuum conduit of all solid material, thereby assuring that the desired quantity of material is delivered from the fluid bed or porous floor container to the receptor container.

According to another embodiment of the invention, a means is provided to pneumatically tilt the support on which the fluid bed or porous floor container rests, whether it is rigid sided or flexible sided, so that the slope of the porous floor is increased to the proper angle to induce the complete discharge of product from the supply container.

These and other objects and advantages of the present invention are provided by means of the novel system and apparatus disclosed and claimed herein and illustrated by the accompanying drawing, in which:

DISCUSSION OF THE DRAWINGS

Figure 1:
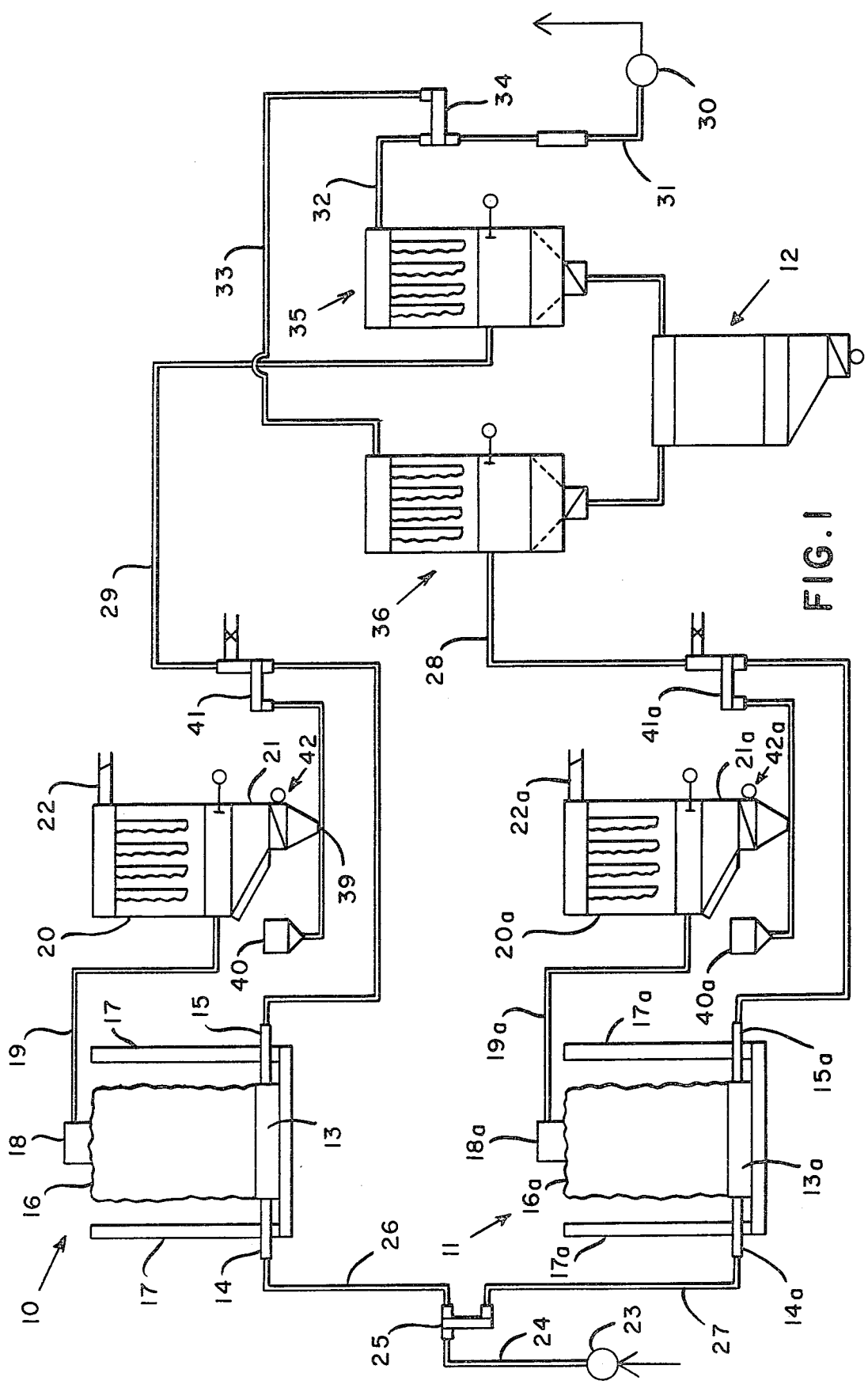
FIG. 1 is a schematic view of a vacuum conveyor system including a plurality of supply containers, each activated by a common air flow source and each delivering the vent air to a filter for separating of the solid particles, exhaust of the filtered air and feeding of the separated particles to the vacuum conduit for delivery to a receptor station.

As shown by FIG. 1, a plurality of identical flexible or rigid porous floor supply container stations 10 and 11 are provided, each adapted to contain different particulate material to be fed in a predetermined exact amount to a receptor hopper 12 from which the individual materials are dispensed to a mixer, not shown. While two supply container stations are illustrated, it should be understood that as many such stations as necessary may be used depending upon the number of different particulate solids being used.

For purposes of brevity the identical elements of the supply stations 10 and 11 are assigned identical reference numerals, the corresponding reference numerals for station 11 carrying the suffix "a". Thus each supply station comprises a conventional porous-floor base 13 having an air flow inlet 14 and a vacuum outlet 15. The base sealingly engages a flexible bag or rigid container 16 which is supported in upright position by a frame 17, such as by means of straps (not shown). The top of each bag 16 sealingly engages a vent connection 18 to which is attached a flexible vent exhaust conduit 19 which provides an air-tight connection between the bag container 16 and a conventional pulse jet filter 20 which is adapted to filter the solid airborne particles from the vent air, causing them to fall to the lower feeder hopper section 21, and to exhaust the filtered air through outlet 22 which conveniently may be vented to the area or outside the building.

As shown, a common air flow source is provided for each of the supply containers. Thus an aeration blower 23 provides a continuous flow of clean air through an air conduit segment 24 to a directional valve 25 which permits the air to flow into either air conduit 26 of the first supply container 10 or into air conduit 27 of the second supply container 11, depending upon which supply container is being emptied. In either case the air flow enters the air slide base 13, passes up through the porous membrane or floor of the base and aerates the solid particulate powder within the container 16 so that it can flow more readily from the vacuum outlet 15. In the case of flexible bag containers, the air flow also inflates the bag container under a slow pressure which is controlled by restricting the vent air flow at a slightly lower rate than the intake air flow to induce the necessary pressure in the bag.

The main vacuum conduits 28 and 29 for the supply stations 10 and 11, respectively, are energized by a vacuum conveying blower 30 which pulls a vacuum through conduit 31 which is alternately connected to conduits 32 and 33 by means of directional valve 34. Conduits 32 and 33 are connected to the exhaust outlets of pulse jet filters 35 and 36, respectively, so that when the valve 34 connects conduit 31 to conduit 32, a vacuum is created in the pulse jet filter 35 and in vacuum conduit 29 to container station 10. Alternately, when the directional valve 34 connects conduit 31 to conduit 33, a vacuum is created in the pulse jet filter 36 and in vacuum conduit 28 to container station 11. The operation of the vacuum directional valve 34 is coordinated with the operation of the blower directional valve 25 so that both are open to the same container station at the same time. When either vacuum conduit is being purged, the blower 23 is deactivated and the directional valve 41 and 41a attached to the conduit 28 or 29 adjacent the container stations 10 and 11, respectively, is moved to admit filtered air to the particular conduit to cause any residual particulate material to be drawn into the particular pulse jet filter. Such purging is critically important in cases where the container stations incorporate a scaling system based upon a subtract weight principle. In such cases the aeration blower 23 is automatically deactivated to stop the feeding of particulate material into the vacuum conduit 28 or 29, as soon as the scale indicates that the predetermined weight of such material has been fed from the container 16 or 16a. However, since a portion of said fed material remains in the vacuum conduit 28 or 29, it must be purged therefrom to the pulse jet filter 35 or 36 so that the predetermined weight of the material is actually conveyed to its destination, i.e., the receptor hopper 12.

A critical feature of the system illustrated by FIG. 1 is the vent air filtration and material separation and recovery provided by the pulse jet filter 20 and feeder hopper 21. As shown, the hopper 21 communicates with a recovery conduit 39 provided with an inlet air filter 40, conduit 39 being connected to the vacuum conduit 29 by means of a directional valve 41 which opens the recovery conduit 39 to the vacuum present in conduit 29 and causes the separated particulate material which deposits in feeder hopper 21 and is fed into the recovery conduit 39 thru valve 42 to be sucked up into the vacuum conduit 29 and conveyed with the main supply of the particulate material. While the quantity of recovered material may not be large, nevertheless, it is critically important that such material is retained confined within the present closed system rather than being permitted to be vented to the atmosphere with the vent air from filter outlet 22.

The system of FIG. 1 is used in cases where the volume of the air from the aeration blower exceeds the air flow within the vacuum conduit so that the vent air must be filtered to separate out the particulate matter which is then recovered and fed back to the vacuum conduit.

Obviously, the system of FIG. 1 may include as many supply stations as necessary to feed as many solid particulate materials as may be required, and in predetermined exact weights, to form the desired end composition. Such materials may be different types of flour, sugar, condiments, etc., to form food compositions or different chemical powders, pigments, etc., to form paints, fertilizers, etc.

Figure 2:
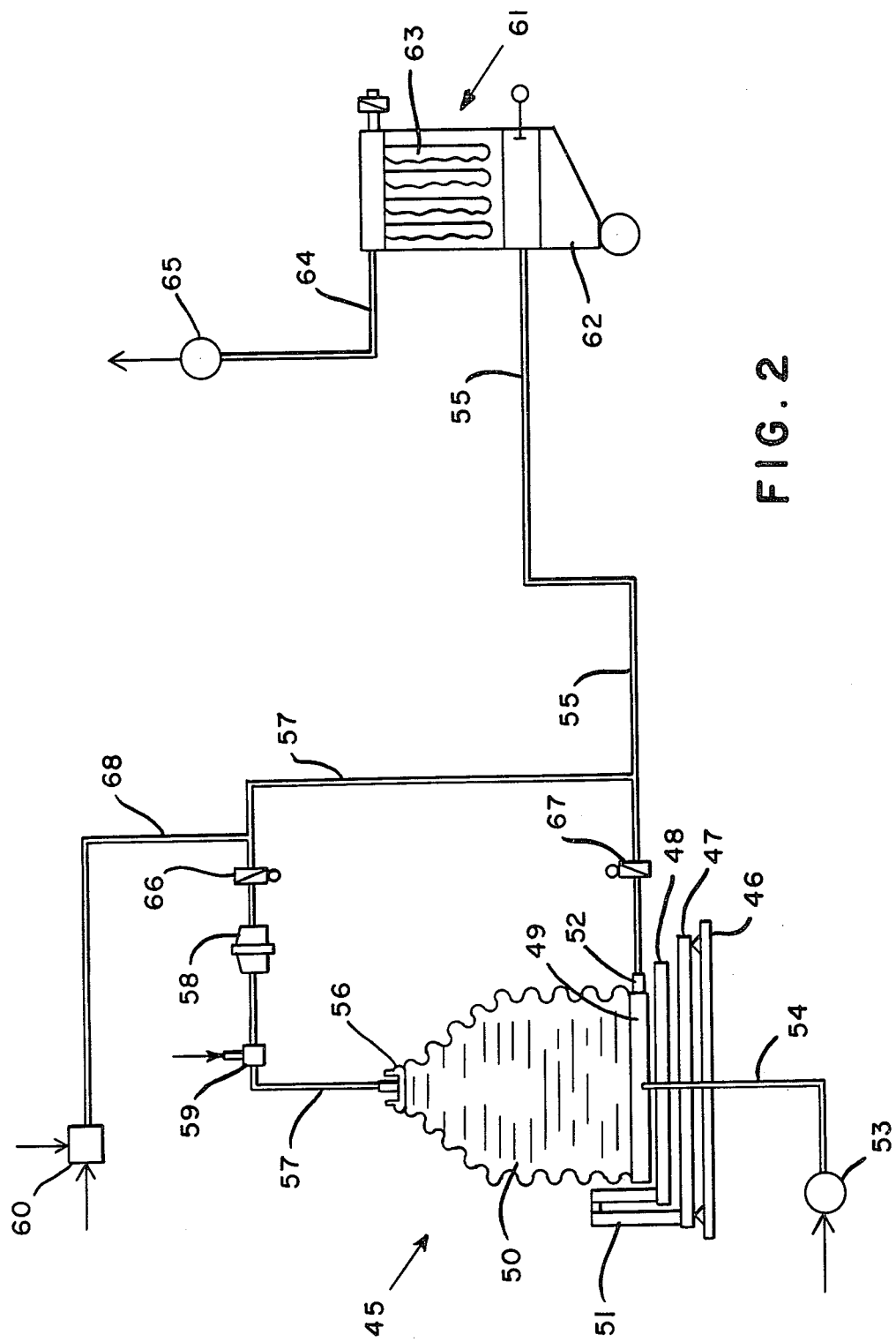
FIG. 2 is a schematic view of a vacuum conveyor system including a single supply container having an air flow source and an air vent conduit which is in closed communication with the vacuum conduit for feeding the contaminated vent air to the vacuum conduit for delivery of the mixture to a work station.

The system of FIG. 2 represents a preferred embodiment from the standpoint of simplicity and efficiency but is only useful in cases where the air flow volume through the vacuum conduit is able to accommodate the controlled air flow volume through the vent system.

Referring to FIG. 2, the container station 45 thereof comprises a portable support base 46 which may be provided with wheels (not shown), a hydraulic, electronic or mechanical scale 47 and a tilting floor 48 supporting the portable air slide base 49 and attached collapsible material container bag 50. Rigid supply containers may also be used. The tilting floor 48 is connected to a pneumatic, hydraulic, mechanical or electrical tilting mechanism 51 which is adapted to raise the floor 48 from the left side to tilt the air slide base 49 and bag 50 in the clockwise direction to assist the complete evacuation of solid particulate material through the vacuum outlet 52 by means of gravity flow when the bag 50 is nearly empty.

The air flow through the air slide base 49 is caused by blower 53 which forces a continuous flow of air through aeration conduit 54 and into base 49. The air passes up through the porous interior floor of the base 49 to aerate the solid particulate material within the bag 50 and render it flowable so that it can be drawn out of the outlet 52 into the vacuum conduit 55.

The aeration air, after passing upwardly through the solid particulate matter within the bag 50, is vented through an air-tight vent cap 56 at the top of the bag into an air-vent conduit 57, passing through an air flow control valve 58 before entering the vacuum conduit 55 to reintroduce any solid particulate material which has become dispersed in the vent air.

The flow control valve 58 limits the rate of the vent air passed therethrough, such as to about 150 cubic feet per minute, so as to maintain the desired air pressure within the bag 50 to keep it extended and keep the vent air passage open without over-pressurizing the bag.

As illustrated, the vent air conduit 57 is also provided with a pressure switch 59 and a secondary air inlet 60 which is adapted to admit secondary air to the vent air conduit in the event that a blockage occurs at the vent cap 56 or within the vent conduit 57 or the control valve 58. Such a blockage will cause an increase in the pressure of the air within the conduit 57, thereby automatically deactivating the blower 53 and admitting secondary air through filter 60. For example, the control valve 58 may be adjusted to maintain a pressure of 4" W. G. within the bag 50, and to open the pressure switch 59 and deactivate the blower 53 at a pressure of 8" W. G., thereby providing a relief system to preclude the possibility of overpressurization and explosion of the bag 50.

As in the system of FIG. 1, the solid particulate material drawn through the vacuum conduit enters a pulse jet filter 61 wherein the solid particulate material falls to the bottom receiving hopper section 62 while the conveying air is drawn up through the filter section 63 and out the vacuum exhaust conduit 64 and through a vacuum conveying blower 65 which is located adjacent to or remote from the filter to exhaust the filtered air.

Scaling accuracy and purging of the conveying conduit 55 is achieved by means of valves 66 and 67 which are activated automatically by the adjustable scale means. When a pre-set weight of material has been discharged from the supply container 50, as detected by the scale 47, the valves 66 and 67 automatically are closed to produce a sharp cut-off and secondary air is automatically admitted through filter inlet 60, and purge conduit 68 to the air vent conduit 57 after the aeration air blower 53 has been deactivated. This opens the conduits 55 and 57 to the atmosphere, through purge conduit 68, to permit filtered air to be drawn into the vacuum conduit 55 and through to the filter 61, carrying with it any residual particulate material present within the conduits 55 and 57 when the blower 53 was deactivated.

Figure 3:
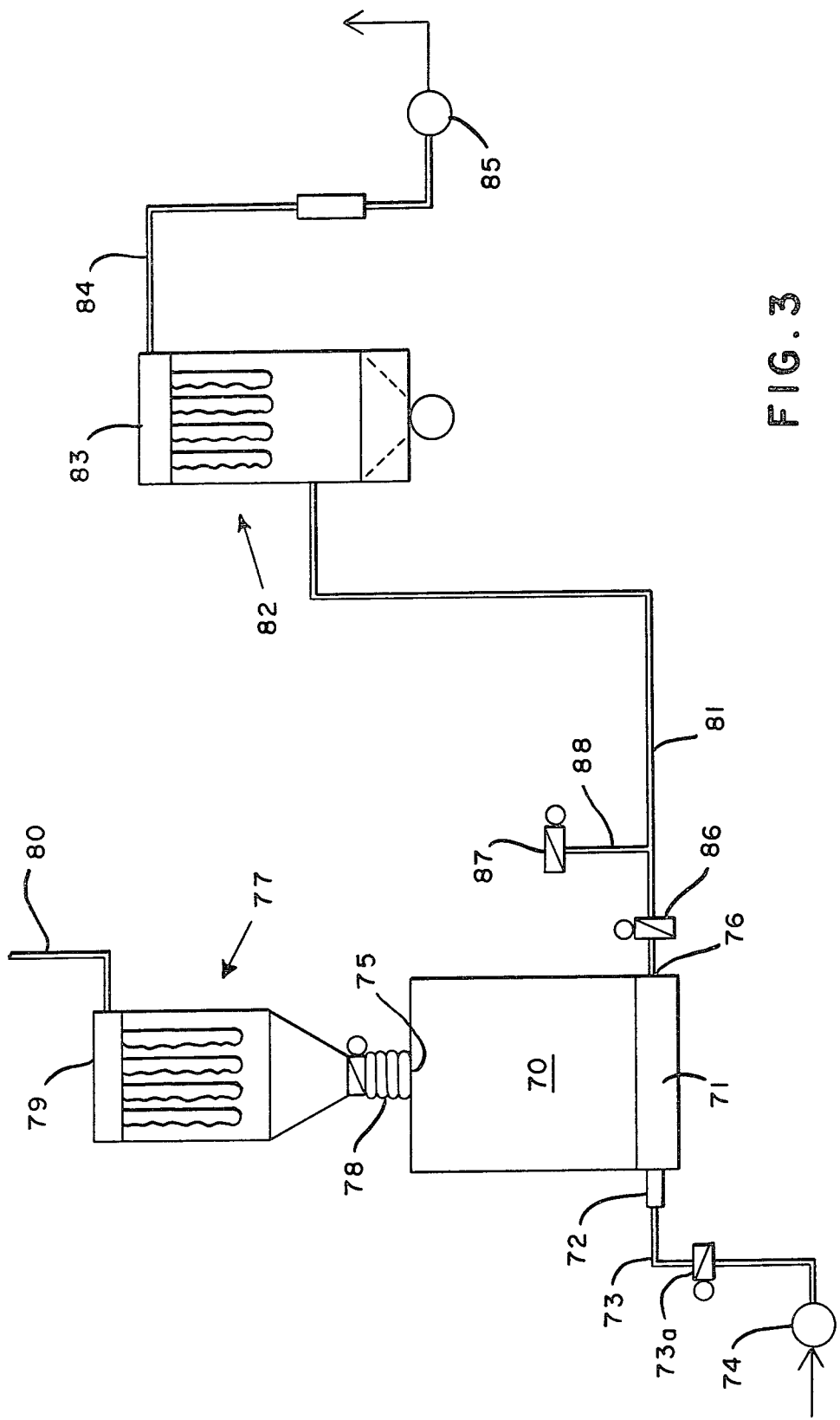
FIG. 3 is a schematic view of a vacuum conveyor system including a single rigid porous floor supply container having an air flow source and an air vent outlet communicating with a material recovery unit comprising a pulse jet filter which exhausts the vent air and returns the recovered solid particulate material to the supply container.

The embodiment of the present invention illustrated by FIG. 3 permits the separation of vented particles from the vent air, direct return of said particles to the supply container and venting of the purified, filtered vent air to the atmosphere.

The supply container 70 of FIG. 3 is a rigid, portable unitary air slide hopper or container, durable and compact in size and cubical or rectangular in shape to permit stacking during shipment or storage. Container 70 has an integral base 71 having a porous floor, an aeration air inlet 72 to which an aeration air conduit 73 having a blower 74 is attachable.

The container 70 has two other outlets, namely the vent air outlet 75 and the vacuum discharge outlet 76. The vent air outlet is connected to a pulse jet filter 77 by means of an airtight flexible air vent conduit 78 and the filtered air compartment 79 of filter 77 exhausts clean air to the atmosphere through exhaust outlet 80. Thus, the vent air is drawn into the filter 77 to filter all of the solid particulate material from the aeration air, the filtered purified air is exhausted to the atmosphere and the recovered solid particulate material is returned to the supply container.

The vacuum discharge outlet 76 is connected to a vacuum conduit 81 which communicates with a pulse jet filter receptor container 82 having a filtered air compartment 83 which communicates with outgoing exhaust conduit 84 through which a vacuum is induced by means of blower 85.

The solid particulate material delivered from the supply container 70 to the receptor filter 82 is filtered and collected therein until the scaled weight has been accumulated, at which time the content is delivered to an ultimate destination. As also illustrated by FIG. 2, the system of FIG. 3 includes valves 86 and 87 and a purging conduit 88, the scaling system deactivating blower 74, closing valve 86 and opening valve 87 to purge the vacuum conduit 81 to the receptor filter 82 as soon as the scaled weight has been dispersed from container 70.

As is apparent to those skilled in the vacuum conveying and scaling field, the various blowers and valves of the present apparatus are automatically controlled by electronic means which include the pre-settable and variable scale means. Thus, as soon as the predetermined weight of solid particulate material has been fed from the container station, the scaling system deactivates the aeration blower, activates the purging system and causes the conveyed material to be deposited in the receptor hopper or container for its intended use.

Also, in cases where a succession of particulate materials are being scaled and conveyed, as in the system of FIG. 1, the completion of purging step for the first container station activates the aeration conduit valve 25 and the vacuum conduit valve 34 to tie the second container station and pulse jet filter into the air flow for scaling of the second particulate material. In this connection reference is made to my earlier U.S. Pat. No. 3,797,890, the disclosure of which is incorporated by reference.

It should be understood that the present scaling system may be cumulative, by the incorporation of memory means, to permit the scaling of a weight of solid particulate material greater than the weight accommodated by a single supply container and/or to provide a reading indicative of the total weight of solid particulate material delivered during any predetermined time period.

While the preferred delivery system of the present invention involves a vacuum delivery conduit, as illustrated by the drawings, it should be understood that other delivery conduits may also be used such as those based upon gravity feed, porous-floor conveyor feed, screw conveyor fee or other known systems for moving solid particulate material through a conduit to a receptor container. However, in all such systems the present invention enables the fluidization and dispensing of the solid particulate material to the delivery conduit, the recovery of all solid particulate material dust from the vented fluidizing air and the dispensing of said recovered solid particulate material into said delivery conduit, thereby preventing contamination of the environment, waste of material and accuracy of scaling systems based upon the loss-in-weight or subtract-weight principle.

In cases where the particulate material being supplied by the present system has a caking property which retards the tendency of the solid to flow evenly from the supply container, such as lead pigments and titanium pigments, etc., it has been found desirable to provide a solenoid valve on the air inlet conduit, such as valve 73a as shown on conduit 73 of FIG. 3, which valve is actuated to close at regular intervals for a few seconds in order to build up the air pressure and then to open and release said pressure into the porous-floor base. Such intermittent bursts of the pressurized air have been found to produce more complete dispensing of such particulate materials. Actuation of the valve may be limited to periods when the supply container is nearly empty and may be electrically-controlled by the scale.

Variations and modifications will be apparent to those skilled in the art within the scope of the appended claims.

I claim:

1. Pneumatic scaling system for aerating and conveying predetermined amounts of a dry solid particulate material from a supply container to one or more receiving containers and for controlling all of the air in said system to prevent the discharge of any solid particulate material into the atmosphere, comprising a closed fluidized bed supply container for solid particulate material, said container having a porous floor, an air inlet for introducing fluidizing air beneath said floor, a fluidized material outlet above said floor and an air vent outlet above the level of said particulate material, blower means for supplying a continuous flow of fluidizing air to said inlet and through said porous floor to fluidize the particulate material within said supply container, a vacuum delivery conduit connected to said fluidized material outlet and terminating at a filter means adapted to separate all of the solid particulate material from the conveying air and to release the filtered conveying air while directing all of the solid particulate material to one or more receiving container(s), valve means in said vacuum delivery conduit for closing said vacuum delivery conduit, an external material recovery conduit connected to said air vent outlet of the supply container to convey all of the vented solid particulate material and vent air from said supply container to said vacuum delivery conduit at a point beyond said valve means and thence to said filter means, valve means in said material recovery conduit for closing said material recovery conduit, secondary air inlet means for introducing external air through said material recovery conduit and said vacuum delivery conduit to purge the contents thereof to said filter means, and an adjustable scaling means adapted to sense the weight loss of the supply container and cause deactivation of the blower means and closing of said valve means in said vacuum delivery conduit and opening of said air inlet means to purge said vacuum delivery conduit and said material recovery conduit to said filter means when a predetermined weight of solid particulate material has been fed from said supply container.

2. A system according to claim 1 in which said material recovery conduit comprises a filter means adapted to separate any vented solid particulate material from said vent air and to release the filtered vent air from said material recovery conduit while directing the solid particulate material through an air vent conduit to said vacuum delivery conduit.

3. A system according to claim 1 in which said material recovery conduit comprises an air vent conduit adapted to convey the vented solid particulate material and the vent air to said vacuum delivery conduit.

4. A system according to claim 3 in which said supply container comprises a inflatable bag and said air vent conduit comprises a pressure-regulating means for controlling said blower means to maintain a sufficient pressure within said inflatable bag to keep it properly inflated and a pressure switch to deactivate the blower means if the pressure within the bag becomes excessive.

5. A system according to claim 1 comprising a plurality of said supply containers, each adapted to contain a different solid particulate material and to convey said material to a common receiving container.

6. A system according to claim 5 in which each of said supply containers is provided with its own vacuum delivery conduit, and a common vacuum-inducing means is used for each of said vacuum delivery conduits, alternate connection means being provided to connect any one of said vacuum delivery conduits to said vacuum-inducing means to permit the conveyance of solid particulate material from any one of said supply containers.

7. A system according to claim 5 or 6 in which each of said supply containers is provided with a common blower means for supplying fluidizing air to its inlet, alternate connection means being provided to connect the inlet means of any one of said containers to said blower means to permit the fluidizing and conveyance of said solid particulate material from any one of said supply containers.

8. A system according to claim 7, in which the adjustable scaling means is adapted to cause deactivation of the blower means when a predetermined weight of solid particulate material has been fed from a first supply container, connection of said blower means to the inlet of a second supply container and reactivation of said blower means to cause conveyance of a predetermined weight of said particulate material from said second supply container.

9. A system according to claim 6 in which the adjustable scaling means is adapted to cause deactivation of the blower means when a predetermined weight of solid particulate material has been fed from a first supply container, connection of said vacuum-inducing means to the vacuum delivery conduit of a second supply container and re-activation of said blower means to cause conveyance of a predetermined weight of solid particulate material from said second supply container.

10. A system according to claim 1 wherein said secondary air inlet means on said material recovery conduit is adjacent said supply container and adapted to permit the entry of secondary air to said material recovery conduit to purge said vacuum delivery conduit of said solid particulate material after said blower means has been deactivated.

11. A system according to claim 1 in which means are provided for disrupting said flow of fluidizing air to said air inlet at regular brief intervals to cause said air to flow in the form of intermittent bursts of pressurized air.

12. Method for aerating and conveying predetermined amounts of a dry solid particulate material from a supply container to one or more receiving containers and for controlling all of the air in said system to prevent the discharge of any solid particulate material into the atmosphere, comprising confining a dry solid particulate material within a closed fluidized bed supply container having a porous floor, and air inlet for introducing fluidizing air beneath said floor, a fluidized material outlet above said floor and an air vent outlet above the level of said particulate material, supplying a continuous flow of fluidizing air to said inlet and through said porous floor to fluidize the particulate material within said supply container and cause it to exit said fluidized material outlet into a vacuum delivery conduit connected to said fluidized material outlet; filtering said fluidized particulate material to separate all of the solid particulate material from the conveying air; releasing the filtered conveying air and directing all of the solid particulate material to one or more receiving container(s), connecting said air vent outlet of the supply container to a recovery conduit to convey all of the vented solid particulate material and vent air from said supply container; filtering said vented material and vent air; releasing the filtered vent air and directing all of the vented solid particulate material to one or more receiving container(s), sensing the weight loss of the supply container, stopping the flow of fluidizing air to said supply container when a predetermined weight of solid particulate material has been fed from said supply container, closing said vacuum delivery conduit to said supply container, and introducing secondary air through said recovery conduit to said vacuum delivery conduit to purge the contents thereof to said receiving container(s).

13. Method according to claim 12 in which said air exhausted through said air vent outlet is filtered to separate any vented solid particulate material from said vent air, the filtered vent air is released and the recovered particulate material is returned to said vacuum delivery conduit.

14. Method according to claim 12 in which said air exhausted through said air vent outlet comprising vented solid particulate material and fluidizing air, is conveyed to said vacuum delivery conduit.

15. Method according to claim 12 which comprises supplying said flow of fluidizing air to said air inlet in the form of intermittent bursts of pressurized air.

16. Method according to claim 12 in which said supply container comprises an inflatable bag, a sufficient pressure is maintained within said inflatable bag to keep it inflated and the supply of fluidizing air is cut off and secondary air is admitted to said exhaust air if the pressure within the inflatable bag becomes excessive.

17. Method according to claim 12 in which the solid particulate material and the conveying air are filtered prior to discharge into said receiving container(s), the filtered conveying air is released and the solid particulate material is discharged into said receiving container(s).

18. Method according to claim 12 comprising using a plurality of said supply containers, each adapted to contain a different solid particulate material and to convey said material to a common receiving container.

19. Method according to claim 18 which comrises providing each of said supply containers with its own vacuum delivery conduit and with a common vacuum-inducing means, and alternately connecting each of said vacuum delivery conduits to said vacuum-inducing means to permit the conveyance of solid particulate material from each of said supply containers.

20. Method according to claim 18 or 19 which comprises providing each of said supply containers with a common blower means for supplying fluidizing air to its inlet, and alternately connecting each of said containers to said blower means to permit the fluidizing and conveyance of said solid particulate material from each of said supply containers.

21. Method according to claim 19 comprising deactivating the blower means when a predetermined weight of solid particulate material has been fed from a first supply container, connecting said vacuum-inducing means to the vacuum conduit of a second supply container and re-activating of said blower means to cause conveyance of a predetermined weight of solid particulate material from second supply container.

22. Method according to claim 12, comprising deactivating the blower means when a predetermined weight of solid particulate material has been fed from a first supply container, connecting said blower means to the inlet of a second supply container and reactivating said blower means to cause conveyance of a predetermined weight of said particulate material from said second supply container.

23. Pneumatic scaling system for aerating and conveying predetermined amounts of a dry solid particulate material from a supply container to one or more receiving containers and for controlling all of the air in said system to prevent the discharge of any solid particulate material into the atmosphere, comprising a closed fluidized bed supply container for solid particulate material, said container having a porous floor, an air inlet for introducing fluidizing air beneath said floor, a fluidized material outlet above said floor and an air vent outlet above the level of said particulate material, blower means for supplying a continuous flow of fluidizing air to said inlet and through said porous floor to fluidize the particulate material within said supply container, a vacuum delivery conduit connected to said fluidized material outlet and terminating at a filter means adapted to separate all of the solid particulate material from the conveying air and to release the filtered conveying air while directing all of the solid particulate material to one or more receiving container(s), valve means in said vacuum delivery conduit for closing said vacuum delivery conduit, an external material recovery conduit connected to said air vent outlet of the supply container to convey all of the vented solid particulate material and vent air from said supply container to said filter means, valve means in said material recovery conduit for closing said material recovery conduit, secondary air inlet means for introducing external air to said vacuum delivery conduit to purge the contents thereof to a said filter means, and an adjustable scaling means adapted to sense the weight loss of the supply container and cause deactivation of the blower means and closing of said valve means in both said vacuum delivery conduit and said material recovery conduit and opening of said air inlet means to purge said vacuum delivery conduit to said filter means when a predetermined weight of solid particulate material has been fed from said supply container.

24. Method for aerating and conveying predetermined amounts of a dry solid particulate material from a supply container to one or more receiving containers and for controlling all of the air in said system to prevent the discharge of any solid particulate material into the atmosphere, comprising confining a dry solid particulate material within a closed fluidized bed supply container having a porous floor, an air inlet for introducing fluidizing air beneath said floor, a fluidized material outlet above said floor and an air vent outlet above the level of said particulate material, supplying a continuous flow of fluidizing air to said inlet and through said porous floor to fluidize the particulate material within said supply container and cause it to exit said fluidized material outlet into a vacuum delivery conduit connected to said fluidized material outlet; filtering said fluidized particulate material to separate all of the solid particulate material from the conveying air; releasing the filtered conveying air and directing all of the solid particulate material to one or more receiving container(s), connecting said air vent outlet of the supply container to a recovery conduit to convey all of the vented solid particulate material and vent air from said supply container; filtering said vented material and vent air; releasing the filtered vent air and directing all of the vented solid particulate material to one or more receiving container(s), sensing the weight loss of the supply container, stopping the flow of fluidizing air to said supply container when a predetermined weight of solid particulate material has been fed from said supply container, closing both said vacuum delivery conduit and said recovery conduit to said supply container, and introducing secondary air to said vacuum delivery conduit to purge the contents thereof to said filter means.

* * * * *

UNITED STATES PATENT AND TRADEMARK OFFICE
CERTIFICATE OF CORRECTION

PATENT NO. : 4,367,987

DATED : January 11, 1983

INVENTOR(S) : Armon J. Walters

It is certified that error appears in the above-identified patent and that said Letters Patent are hereby corrected as shown below:

Column 7, line 30, "fee" should read -- feed --.

Signed and Sealed this

Seventeenth Day of May 1983

[SEAL]

Attest:

DONALD J. QUIGG

Attesting Officer    Acting Commissioner of Patents and Trademarks